Dec. 5, 1961 L. C. COX 3,011,795
TANDEM AXLE SUSPENSION
Filed Aug. 14, 1958 2 Sheets-Sheet 1

INVENTOR.
*Lonzo C. Cox*
BY

Dec. 5, 1961 L. C. COX 3,011,795
TANDEM AXLE SUSPENSION
Filed Aug. 14, 1958 2 Sheets-Sheet 2
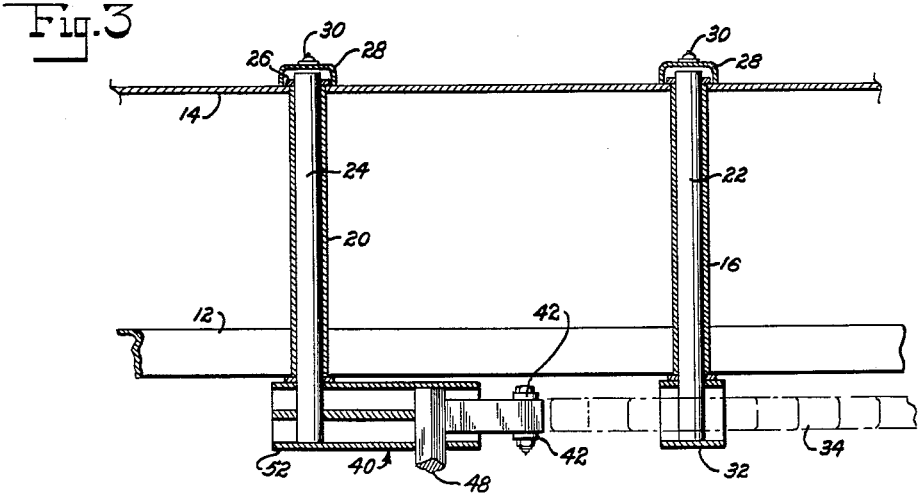
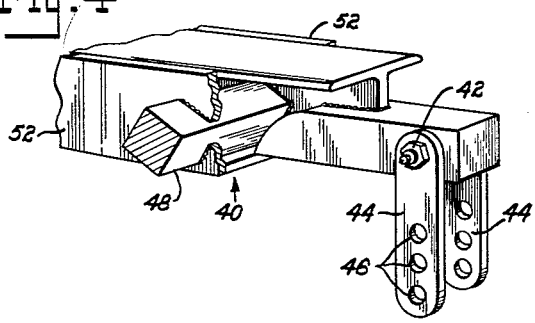
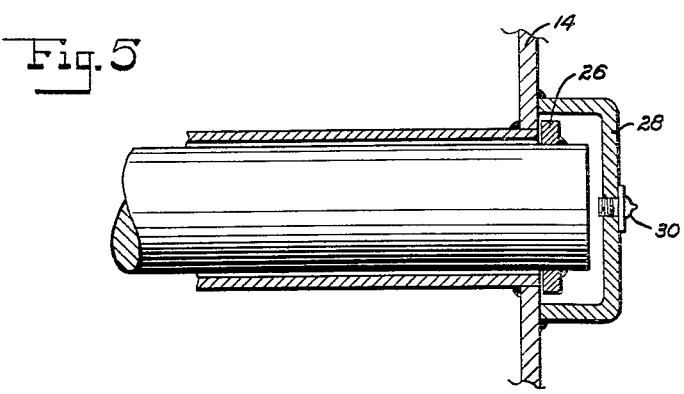
INVENTOR.
*Lonzo C. Cox*
BY
*C. M. McAfee*
Atty.

United States Patent Office 3,011,795
Patented Dec. 5, 1961

3,011,795
TANDEM AXLE SUSPENSION
Lonzo C. Cox, 3004 Garden City Highway, Midland, Tex.
Filed Aug. 14, 1958, Ser. No. 755,058
4 Claims. (Cl. 280—104.5)

This invention pertains to tandem axle suspension and, more particularly, to tandem wheeled trailers for hauling horses and other livestock.

Show, race, and rodeo horses are customarily transported from one place to another in a trailer which is towed at high speeds behind a conventional automobile. The animals are quite valuable and it is necessary to be able to transport them with a minimum of vibration and rough handling. Otherwise, not only might they be damaged but they would arrive in a fatigued or nervous condition and not be able to perform well. Therefore, great care souid be given to the design of a vehicle for their transportation.

As in all vehicles a low center of gravity is desirable. However, as the cargo for this vehicle will be an animal, its center of gravity is necessarily high. Therefore, every effort should be made to lower the flooring and frame of the vehicle so that when loaded, the center of gravity of the vehicle and cargo together will be as low as possible. This is particularly desirable when the vehicle is to travel at high rates of speed over rough and winding roads as often occur in Western United States where much of this transportation takes place.

It is also desirable that the trailer should not tilt appreciably when the animal is being loaded therein. Although these trailers are normally designed to haul two horses and have stalls therein for that purpose, it is desirable to be able to haul a single horse on either side without causing the vehicle to list.

I have invented a tandem suspension system for a trailer embodying these features. The wheels are mounted so that they are able to go over rough terrain and with a minimum transmission of jolts to the vehicle itself.

An object of this invention is to provide a trailer with the advantages mentioned above.

Another object is to provide for easy adjustment of the height of the frame above ground level in case the terrain is too rough to permit the lowest possible center of gravity.

Further objects are to achieve the above with a device that is sturdy, compact, simple, and reliable, yet cheap and easy to manufacture.

The specific nature of the invention as well as other objects, uses, and advantages thereof will clearly appear from the following description and from the accompanying drawing, in which:

FIG. 3 is a fragmental sectional view similar to FIG. 1.

FIG. 4 is a perspective detail of one end of the rocker arms, partially broken away.

FIG. 5 is a detail sectional view of one of the connections of the tube and shaft to an inboard stringer.

Figure 1:
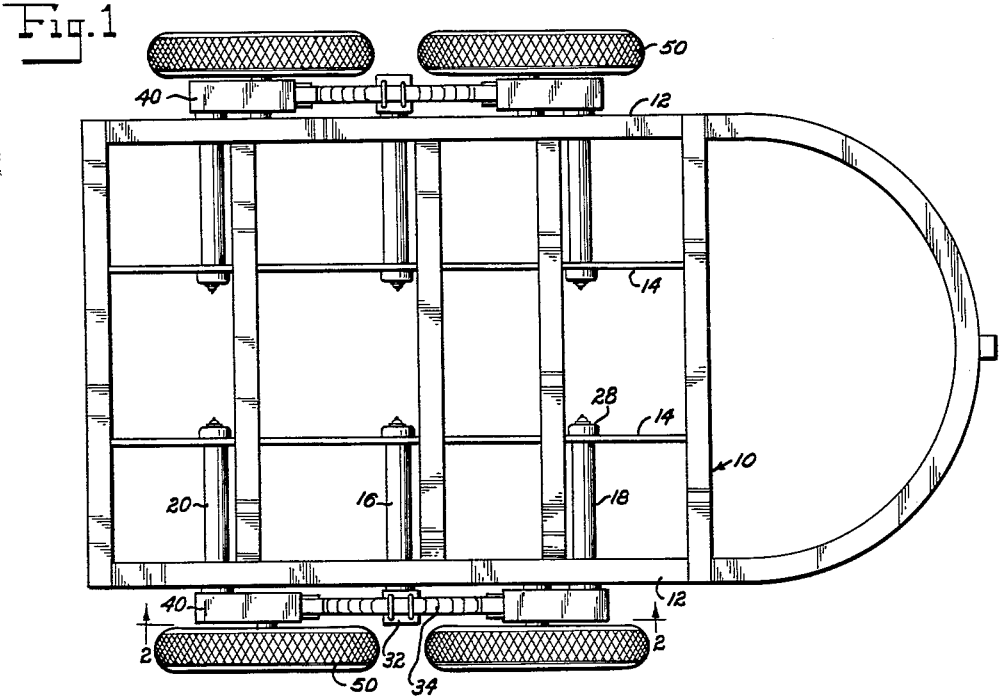
FIG. 1 is a plan view of the trailer frame and suspension system according to this invention.
Figure 2:
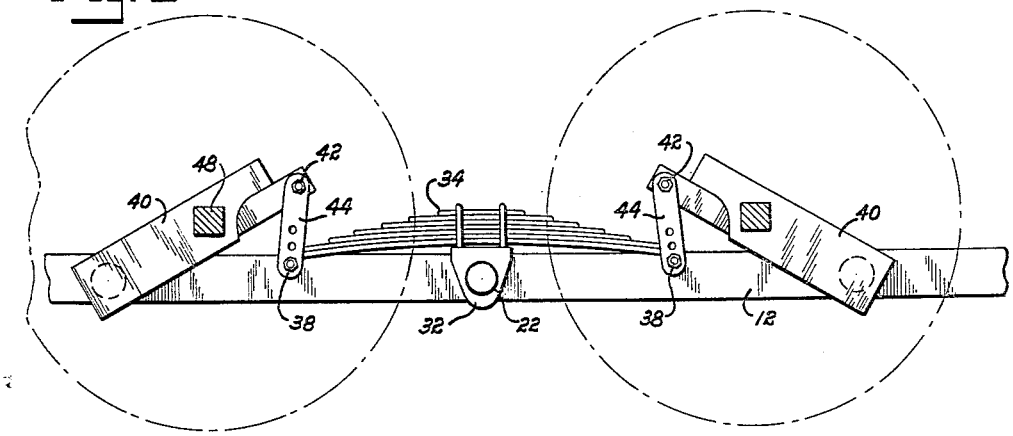
FIG. 2 is a cross sectional view taken on line 2—2 of FIG. 1.

One embodiment of this invention as seen in the accompanying drawings is particularly adapted for a two-horse trailer.

The frame 10 of the trailer has an outboard stringer 12 along each of the longitudinal edges of the frame. The frame is connected together by various transverse braces. The frame also has two inboard stringers 14 extending between the cross braces. The inboard stringers are parallel to the outboard stringers and are spaced inboard therefrom.

As the trailer is symmetrical about its longitudinal axis; hereafter, the details of construction of only one side will be given. Center tube 16 extends from the inboard stringer to the outboard stringer. The tube is transverse of the vehicle, i.e., it is normal to the longitudinal axis and to the stringers. The tube is located at about the center of the load of the trailer when loaded or slightly behind the center of the load. It is contemplated that the cargo would be centered over the tube 16; however, the trailer has a rounded forward portion which would not carry appreciable cargo but which would shift the center weight of the vehicle slightly forward of the tube 16. The tube 16 extends through holes in the stringers and is welded to the stringers. By like construction the forward tube 18 and after tube 20 are welded between the inboard and outboard stringers. The forward tube is near the forward cargo carrying end and the after tube is near the back end of the trailer. The tubes are parallel. Center shaft or axle 22 is journalled within the center tube. A rocker arm shaft or axle 24 is journalled in each of the forward and after tubes. Washer 26 is welded to the inboard end of each shaft. The washer 26 abuts against the inboard side of the inboard stringer and therefore provides a means for preventing the shafts from moving axially outward. A cup 28 is welded to the inboard stringer over the end of each shaft and washer. Each cup is provided with grease fitting 30 so that the annular space between the tube and the shaft may be filled with a lubricant. It will be understood that the shafts are snugly journalled within the tube; however, as in all machine elements there will be a slight space between them.

On the outboard side of each outboard stringer a washer is fitted over the shaft. Pivot block 32 is welded on center shaft 22. The pivot block fits snugly against the washer so that the shaft 20 is prevented from moving inward axially. Each shaft is free to rotate within its tube. By means of conventional U-bolts a leaf spring 34 is attached above the pivot block. The leaf spring extends on both sides of the pivot block and at each end it has a rolled end (not shown) for the passage of spring bolt 38.

I prefer to use a rather stiff spring. If the two ends of the spring are supported, a weight of 1400 lbs. at the center of the springs will cause it to depress one inch.

A rocker arm 40 is welded to the outboard end of each rocker arm shaft 24. In like manner the rocker arm is snug against the washer which is around the outboard end of the shaft so that there is a snug joint between the washer and the outboard stringer 12. This prevents axial movement of the rocker arm shaft as well as preventing excessive loss of lubricant. Each rocker arm extends from its rocker arm shaft upward toward the center shaft. On the extreme end of the rocker arm there is a hole parallel to the rocker arm shaft through which passes bolt 42. The length of the rocker arm, i.e., the distance from the axis of shaft 24 to bolt 42, is greater than the distance from the axis of shaft 24 to bolt 38 by a factor of about 1.14. A shackle 44 is pivoted on either side of the rocker arm about the bolt 42. The bolt passes through a hole in one end of each shackle. The shackles depend from the rocker arm and extend toward the rocker arm shaft. On the other end of the shackle there are three holes 46. Spring bolt 38 passes through one of these holes of each shackle therefore connecting the springs to the rocker arms. A spindle 48 is welded to each rocker arm about 55 percent of the distance from the axis of rocker arm shaft to the axis of bolt 42. I.e., if the distance from the axis of the rocker arm shaft bolt 42 is 13½ inches, the distance from the axis of the rocker arm shaft to the axis of the spindle is 7½ inches. A ground engaging wheel 50 is rotatably mounted upon the spindle in a manner well known to the art. Also, an electric brake is provided for the rear two ground engaging wheels as is common in the art. The spindles 48 are parallel with the tube 16.

As may be seen, the rocker arm 40 comprises an H-beam with the flanges at the top and bottom and the web vertical. The beam is boxed, i.e., plates 52 are welded to each of the flanges parallel to the web. As the rocker arm shafts 24 extend through the rocker arm, this provides a particularly rigid connection so that there is no possibility of misalignment due to impacts or stresses on the road. Likewise, the spindles 48 extend entirely through the rocker arm assembly. This fact, coupled with the rather long rocker arm shafts and center shaft provides exceptionally good alignment of all of the parts.

It has been mentioned that the rocker arms extend from the rocker arm shaft to the direction of the center shaft. It will also be noted that the rocker arms extend upward at about a 30-degree angle to the horizontal. This, therefore, places the spindles 48 above the frame of the vehicle. This provides for a low center of gravity. If the center of gravity proves to be so low that enough clearance from the ground is not provided, the amount of clearance may be changed by moving the spring bolts 38 to one of the other holes 46 in each of the shackles.

By placing each of the rocker arm shafts near each end of the cargo portion of the trailer good stability is obtained. When a horse steps in the back of the trailer, negligible tilting occurs. Yet the wheels are close together for good cornering.

It will be apparent that the embodiments shown are only exemplary and that various modifications can be made in construction, materials, and arrangement within the scope of the invention as defined in the appended claims.

I claim as my invention:

1. A suspension construction for mounting tandem wheels to the frame of a vehicle comprising: the frame having outer stringers along the outer edges, inner stringers parallel to the outer stringers and inboard thereof; three parallel tubes on each side of the frame extending transversely from the inner stringer to the outer stringer and welded thereto; a shaft journalled in each tube; a washer welded to each of the shafts inboard the inner stringer to prevent outward movement of the shaft; a cup welded to the inner stringer over each of the ends of shafts and washers; a grease fitting in each cup; a pivot block welded to the outboard end of each of the center shafts; a leaf spring attached above each pivot block; a rocker arm welded at one end to the outboard end of each of the outer shafts, each rocker arm extending toward the center shaft; a bolt through the other end of each rocker arm, a shackle depending on either side of each rocker arm, each bolt passing through a hole in one end of each shackle, the other end of each shackle having three holes therein, a spring bolt passing through one of the three holes on either side of the leaf spring, the spring bolt also passing through a rolled end on the leaf spring; a spindle welded to each rocker arm between where the rocker arm is welded to the shaft and the bolt therein; and a ground engaging wheel rotatably mounted on each spindle.

2. The invention as defined in claim 1 wherein the distance from each of the outer shafts to the bolt in the rocker arm is greater than the distance from said outer shaft to the spring bolt so that the shackle extends from the end of the rocker arm back toward said outer shaft.

3. A suspension construction for mounting tandem wheels to the frame of the vehicle comprising: the frame having stringers along the outer edge, inner stringers parallel to the outer stringers and inboard thereof; three parallel tubes on each side of the frame extending traversely from the inner stringer to the outer stringer and being welded thereto; a shaft journalled in each tube; means for preventing the shafts from moving outboard; means for sealing the inboard terminal of the tube against dirt; a grease fitting attached to the structure having access to the space between the tube and the shaft for lubricating that area; a pivot block welded to the outboard end of each of the center shafts; a leaf spring attached to each pivot block; a rocker arm welded at one end to the outboard end of each of the outer shafts, each rocker arm extending toward the center shaft on its respective side; shackle means pivoted to the other end of each rocker arm and depending therefrom, the other end of each shackle means pivoted to an end of said leaf spring on its respective side; and a spindle welded to each rocker arm between where the rocker arm is welded to the shaft and the point the shackle is pivoted thereto, said spindle being means for rotatably mounting a ground engaging wheel thereto.

4. The invention as defined in claim 3 wherein the three tubes extend through the inner and outer stringer at the same height.

References Cited in the file of this patent

UNITED STATES PATENTS

| | | |
|---|---|---|
| 1,771,488 | Duesler | July 29, 1930 |
| 2,103,381 | Perkins | Dec. 28, 1937 |
| 2,139,592 | Kirby | Dec. 6, 1938 |
| 2,600,768 | Heth | June 17, 1952 |
| 2,698,186 | Pehl | Dec. 28, 1954 |
| 2,704,674 | Gray | Mar. 22, 1955 |
| 2,740,640 | Schaefer | Apr. 3, 1956 |
| 2,774,604 | Rendel | Dec. 18, 1956 |